3,067,154
CALKING AND SEALING COMPOSITION CONTAINING ELASTOMERIC POLYMERS OF ACRYLIC ACID ESTERS
George B. Sterling, Midland, Mich., assignor to The Dow Chemical Company, Midland, Mich., a corporation of Delaware
No Drawing. Filed Oct. 28, 1959, Ser. No. 849,160
7 Claims. (Cl. 260—23)

This invention concerns new compositions of matter suitable for sealing cracks, crevices and joints to make them water-proof and pertains especially to such compositions containing soft elastomeric polymers of acrylic acid esters.

The new compositions are characterized by possessing good adhesiveness to metals, wood, glass, concrete, ceramic, and have good flexibility, elongation and non-hardening properties. They are resistant to acid alkali and water and are useful for sealing cracks, joints and crevices to make them water-proof.

Compositions for sealing cracks, crevices and joints to make them water-proof are commonly prepared by pigmenting a vehicle such as drying, semi-drying and non-drying oils with a filler or inert material such as finely divided clay, talc or short asbestos fibers, together with a solvent to produce a paste or putty-like material which can be pressed or forced into cracks, crevices, fissures or joints by hand pressure or from a calking gun.

Among the difficulties of providing satisfactory calking and sealing compositions is the problem that different geographic sections of the country seemingly require a different basic specification for similar work projects.

It is an object of the invention to provide new calking and sealing compositions suitable for sealing cracks, crevices and joints to make them water-proof, which compositions are characterized by good adhesiveness and resistance to embrittling and cracking upon prolonged exposure to out-of-doors weathering. Another object is to provide non-hardening, calking and sealing compositions comprising soft elastomeric polymers of acrylic acid esters intimately blended with a pigmented vehicle.

According to the invention new calking and sealing compositions possessing good adhesive properties for wood, metal and glass and having good resistance to embrittling and hardening upon exposure to out-of-doors weathering can readily be prepared by intimately blending a soft elastomeric polymer of one or more esters of acrylic acid such as butyl, amyl, hexyl or 2-ethyl hexyl ester of acrylic acid with a filler or inert pigment, e.g. clay, talc, asbestos fibers, and the like, and a bodied drying oil to produce a homogeneous putty or composition.

The elastomeric polymers to be employed in preparing the compositions can be a soft tacky polymer of one or more acrylic acid esters such as butyl acrylate, amyl acrylate, hexyl acrylate, 2-ethylhexyl acrylate, octyl acrylate, tridecyl acrylate, 3,5,5-trimethylhexyl acrylate or copolymers of any two or more of such acrylic acid esters containing from 4 to 13 carbon atoms in the alkyl group of the ester, which polymer has a molecular weight corresponding to a viscosity characteristic of from about 0.8 to 45 centipoises as determined for a 5 weight percent solution of the polymer in toluene at 25° C.

The polymers can be prepared in known ways such as by polymerization in mass, in solution, in suspension or in aqueous emulsion, suitably in the presence of a modifying agent such as aliphatic mercaptans containing from 12 to 16 carbon atoms, e.g. lauryl mercaptan, tert.-dodecyl mercaptan and the like, to control the molecular weight. The aliphatic mercaptans, when employed, can be used in amounts corresponding to from about 1 to about 5 percent by weight, based on the monomeric acrylic acid ester initially used. The molecular weight of the polymers can also be controlled by regulating the temperature of the polymerization or by carrying out the polymerization in a solvent for the monomer and the polymer. In general, the higher polymerization temperatures give polymers of lower molecular weight, and the use of a solvent or a modifying agent, e.g. tert.-dodecyl mercaptan, results in polymers of lower molecular weight than is obtained in the absence of a solvent or modifying agent under otherwise similar conditions. The polymerization can be carried out at temperatures between about 0° and 100° C. and at atmospheric or superatmospheric pressure.

The inorganic filler or inert material can be finely divided clay, calcium carbonate, barium sulfate, silica, ground mineral wool or asbestos fibers, zinc oxide, lithopone, talc or the like. The preferred fillers are fibrous talc, clay and short asbestos fibers or mixtures thereof. The fillers can be used in amounts of from 30 to 80 percent by weight of the composition.

Plasticizers such as drying, semi-drying and non-drying oils, preferably vegetable oils in the form of bodied drying oils such as linseed oil, dehydrogenated castor oil, tung oil, soy bean oil and the like having a viscosity between Z1 and Z9 (Gardner-Holdt) are employed in amounts of from 5 to 25 percent by weight of the composition.

A liquid aliphatic hydrocarbon solvent consisting principally of saturated aliphatic hydrocarbons boiling at temperatures between 60° and 205° C., e.g. petroleum ethers, is usually required in the composition. Such liquid solvent or thinner can be used in amounts of from 5 to 15 percent by weight of the composition.

The calking compositions are prepared by blending or intimately incorporating from 10 to 50 parts by weight of the elastomeric polymer with the inert filler or pigment, the oil vehicle or plasticizer and the aliphatic hydrocarbon solvent or thinner in the desired proportions on compounding rolls, a Banbury mixer or extruder or other suitable device to produce a uniform homogeneous plastic material having a soft to stiff dough-like consistency and capable of being pressed or forced into a ⅛-inch crack or crevice by ordinary hand pressure or of being extruded from a calking gun by hand pressure. The consistency of the composition wall vary somewhat depending upon the intended use and in part upon whether the calking composition is of gun, tube or can grade. The composition should not be of such plastic consistency that it sags when subjected to a sag or slump test such as that described in the bulletin published July 15, 1955, by the Aluminum Window Manufacturing Association, 75 West Street, New York 6, New York.

The compositions of the invention do not sag or slump of their own weight when a triangular body of the material is formed in a 1-inch wide by ½-inch deep channel and placed in an oven in a vertical position and heated at a temperature of 50° C. for a period of 8 hours. The compositions possess good non-hardening properties, are resistant to cracking and shrinking upon prolonged exposure to out-of-doors weathering and do not tend to sag or wrinkle. They are useful for sealing cracks, crevices, joints and the glazing of window glass.

The following examples illustrate ways in which the principle of the invention has been applied, but are not to be construed as limiting its scope.

EXAMPLE 1

In each of a series of experiments, an ester of acrylic acid as identified in the following table was prepared by polymerizing the monomer in an aqueous emulsion to obtain a relatively soft low molecular weight polymer employing the recipe.

| Ingredients: | Parts by weight |
|---|---|
| Monomers | 100 |
| Water | 110 |
| Duponol WAQ (fatty alcohol sodium sulfate) | 0.85 |
| Tert.-dodecyl mercaptan | 5 |
| Sodium bicarbonate | 1 |
| Potassium persulfate | 0.75 |

The ingredients were placed in a glass vessel and were agitated to effect emulsification, then heated with stirring at a temperature of 60° C. for a period of from 24 to 48 hours as stated in the following table to polymerize the monomer. The resulting latex was heated to a temperature of about 100° C. and steam was bubbled therethrough to distill and separate unreacted monomer. The steam-distilled latex was analyzed to determine the proportion of polymer therein. The polymer was recovered by coagulating the latex. Table I identifies the experiments and names the monomer employed in making the homopolymer. The table also gives the polymerization conditions and a viscosity characterstic for the polymer as determined for a 5 weight percent solution of the polymer in toluene at 25° C.

Table I

| Run No. | Starting material—monomer | Polymerization conditions | | Polymer | |
|---|---|---|---|---|---|
| | | Temp., °C. | Time, hrs. | Yield, percent | Viscosity cps. |
| 1 | Butyl acrylate | 60 | 24 | 100 | 0.90 |
| 2 | Amyl acrylate | 60 | 48 | 95 | 0.88 |
| 3 | Hexyl acrylate | 60 | 48 | 40 | 0.87 |
| 4 | 2-ethyl hexyl acrylate | 60 | 24 | 99 | 0.85 |
| 5 | Tridecyl acrylate | 60 | 35 | 95 | 0.85 |

EXAMPLE 2

In each of a series of experiments, a calking and sealing composition was prepared by blending or compounding one of the polymers prepared in Example 1, with added ingredients of a kind and in proportions as hereinafter stated, on a pair of laboratory rolls to form a homogeneous composition. The recipe employed was—

| Ingredients: | Parts by weight |
|---|---|
| Polymer | 30 |
| Fibrous talc (Nytal 200)[1] | 20 |
| Clay No. 33 [2] | 20 |
| Bodied linseed oil Z7 to Z8 (Gardner-Holdt) | 20 |
| Petroleum ether (B.P. 60°–100° C.) | 5 |
| Petroleum ether (B.P. 100–140° C.) | 5 |
| | 100 |

[1] Nytal 200 was a fibrous talc obtained from R. T. Vanderbilt Company.
[2] Clay No. 33 was a finely divided inert material of a cream color obtained from Southern Clay Inc. It consisted of particles of which 38 percent by weight were of sizes below 2 microns, and contained 43.75 percent by weight of $Al_2O_3$, 54.0 percent $SiO_2$, 0.25 percent $Fe_2O_3$, 0.75 percent $TiO_2$ and 1.25 percent $K_2O \cdot Na_2O$, by analysis.

The composition was employed to seal a 4 x 8 inch glass window pane in a wood frame. The unit was exposed to out-of-doors weathering for a period of 12 months at about latitude 25° north in the State of Florida. The calking was observed from time to time for signs of deterioration. Table II identifies the calking composition and gives the characteristics of the same as initially prepared and the condition of the calking after exposure to out-of-doors weathering for a period of 12 months.

Other portions of the composition were tested for sag. The procedure for determining sag for the composition was to fill a steel channel 1-inch wide by ½-inch deep 8-inches long made from No. 28 U.S. gauge steel with a triangular body of the composition and place the so-filled channel in an oven with the 1-inch side of the right angle of the body of the composition in a vertical position and the point of the triangular body of the composition on the bottom of the channel and heat the mass at a temperature of 50° C. for a period of 7 hours. Thereafter, the composition was observed for sagging. In Table II the Test No. of the composition corresponds to a composition prepared from the copolymer having the same run No. given in Table I.

Table II

| Test No. | Polymer kind | Viscosity, cps. | Calking composition properties |
|---|---|---|---|
| 1 | Butyl acrylate | 0.90 | Soft tacky, guns well, good elongation, no sag, no cracks after out-of-doors exposure. |
| 2 | Amyl acrylate | 0.88 | Do. |
| 3 | Hexyl acrylate | 0.87 | Do. |
| 4 | Tridecyl acrylate | 0.85 | Do. |

EXAMPLE 3

In each of a series of experiments, a calking composition was prepared employing the polymerized tridecyl acrylate prepared in Example 1 and added ingredients as stated in the following table by compounding the mixture of the ingredients on a pair of laboratory rolls to form a homogeneous composition. The calking composition was tested employing procedure similar to that employed in Example 2. Table III identifies the experiments and gives the proportions of the ingredients employed in making the composition and the properties determined for the composition.

Table III

| Run No. | Polymer, percent | Talc percent | Asbestos shorts, percent | Clay No. 33, percent | Linseed oil (Z7–Z8), percent | Pet. ether (B.p. 100–140°C.), percent | Remarks |
|---|---|---|---|---|---|---|---|
| 1 | 10 | 50 | 20 | 10 | 5 | 5 | Stiff, not tested. |
| 2 | 10 | 55 | 5 | 10 | 10 | 10 | Soft tacky, guns well, good elongation, no sag, no cracks after out-of-doors exposure. |
| 3 | 50 | 10 | 15 | 5 | 10 | 10 | Do. |
| 4 | 50 | 15 | 15 | 10 | 5 | 5 | Stiff, guns poor, no sag, fair elongation. |

The data in Table III show that by varying the proportions of the added ingredients, good calking and sealing compositions can be prepared containing from 10 to 50 percent by weight of the polymer. Runs Nos. 1 and 4 are not satisfactory compositions, but runs Nos. 2 and 3 are excellent.

EXAMPLE 4

A charge of 25 parts by weight of 2-ethylhexyl acrylate, 25 parts of butyl acrylate, 25 parts of amyl acrylate and 25 parts of hexyl acrylate were copolymerized in an aqueous emulsion employing the recipe described in Example 1 and heating the mixture at 60° C. for 24 hours. The copolymer was obtained in a yield of 74 percent and as a soft tacky product having a viscosity characteristic of 0.88 as determined for a 5 weight percent solution of the copolymer in toluene at 25° C.

A calking and sealing composition was prepared from the copolymer and added ingredients of a kind and in proportions as given in the recipe described in Example 2. The composition was a soft tacky product. It gunned well, had good elongation, no sag and had no cracks after exposure to out-of-doors weathering for a period of 12 months.

EXAMPLE 5

A charge of 50 parts by weight of 2-ethylhexyl acrylate and 50 parts of butyl acrylate was copolymerized in aqueous emulsion employing the recipe employed in Example 1 and heating the ingredients at a temperature of 60° C. for a period of 24 hours. The yield of copolymer was quantitative. The product was a soft tacky material having a viscosity characteristic of 0.88 (5 percent solution in toluene at 25° C.).

A calking and sealing composition was prepared from the copolymer and added ingredients of a kind and in proportions as given in the recipe described in Example 2. The composition was a soft tacky product. It adhered well to wood, glass and metal. The composition was readily extruded under hand pressure from a calking gun, had good elongation, no sag and had no cracks after exposure to out-of-doors weathering for a period of 12 months.

EXAMPLE 6

In each of two experiments, a mixture of butyl acrylate and 2-ethyl acrylate was polymerized in an aqueous emulsion employing the recipe employed in Example 1 and heating the ingredients at a temperature of 60° C. for a period of 24 hours. In experiment A the copolymer was prepared from a mixture of 25 percent by weight of 2-ethylhexyl acrylate and 75 percent of butyl acrylate. The copolymer was obtained in 99 percent yield as a soft tacky material having a viscosity characteristic of 0.90 centipoise (5 percent solution in toluene). In experiment B the copolymer was prepared from a mixture of 75 percent by weight of 2-ethylhexyl acrylate and 25 percent of butyl acrylate. The copolymer was obtained in quantitative yield. It was a soft tacky product having a viscosity characteristic of 0.88 centipoise (5 percent solution in toluene).

Calking and sealing compositions were prepared by compounding on laboratory rolls 30 parts by weight of the copolymer with 25 parts of talc, 25 parts of short asbestos fibers, 15 parts of bodied linseed oil Z7 to Z8 (Gardner-Holdt), 5 parts of petroleum ether (B.P. 60°–100° C.) and 5 parts of petroleum ether (B.P. 100°–140° C.). The compositions were soft tacky materials. They had good adherence to wood, metal and glass. They gunned well, had good elongation, no sag and no cracks after exposure to out-of-doors weathering for a period of 12 months.

EXAMPLE 7

In each of a series of experiments, a homopolymer of 2-ethylhexyl acrylate was prepared by polymerizing the monomer in an aqueous emulsion employing the recipe—

| Ingredients: | Parts by weight |
|---|---|
| 2-ethylhexyl acrylate | 100 |
| Water | 110 |
| Duponol WAQ (fatty alcohol sodium sulfate) | 0.85 |
| Tert.-dodecyl mercaptan | Variable |
| Sodium bicarbonate | 1 |
| Potassium persulfate | 0.75 |

The ingredients were placed in a closed container and were agitated to effect emulsification, then were heated with agitation at a temperature of 60° C. for from 24 to 30 hours to polymerize the monomer. The resulting latex was heated at about 100° C. and steam bubbled therethrough to remove unreacted monomers. The polymer was recovered by coagulating the latex. A viscosity characteristic was determined for the polymer by dissolving a portion of the dried polymer in toluene to form a 5 weight percent solution of the polymer in the solvent and determining the absolute viscosity of the solution at 25° C. Table IV identifies the experiments, gives the polymerization time and temperature conditions, the percent yield of polymer based on the monomer initially used and a viscosity characteristic determined for the polymer.

*Table IV*

| Run No. | Monomer, kind | Tert.-dodecyl mercaptan | Polymerization conditions | | Polymer | |
|---|---|---|---|---|---|---|
| | | | Temp., °C. | Time, hrs. | Yield | Viscosity cps. |
| 1 | 2-ethylhexyl acrylate | 1 | 60 | 30 | 100 | 2.2 |
| 2 | ---do--- | 2 | 60 | 30 | 100 | 1.84 |
| 3 | ---do--- | 3 | 60 | 30 | 84 | 1.28 |
| 4 | ---do--- | 5 | 60 | 24 | 99 | 0.85 |

EXAMPLE 8

In each of a series of experiments, a calking and sealing composition was prepared by blending a portion of one of the polymers prepared in Example 7 with added ingredients employing the recipe—

| Ingredients: | Parts by weight |
|---|---|
| Homopolymer of 2-ethylhexyl acrylate | 10 |
| Fibrous talc | 25 |
| Clay No. 33 | 5 |
| Asbestos shorts | 20 |
| Bodied linseed oil Z7–Z8 | 25 |
| Petroleum ether (B.P. 60°–100° C.) | 5 |
| Petroleum ether (B.P. 100°–140° C.) | 5 |
| | 100 |

The ingredients were compounded with one another on a pair of laboratory rolls at room temperature to form a homogeneous putty-like composition.

The composition was tested employing procedure similar to that described in Example 2. Table V identifies the calking composition by a "Test No." corresponding to the homopolymer of the same Run No. in Table IV and gives the properties of the calking composition.

*Table V*

| Test No. | Viscosity of 2-ethylhexyl acrylate homopolymer, cps. | Properties of calking composition |
|---|---|---|
| 1 | 2.2 | Medium stiff, guns fair, no sag, fair elongation. |
| 2 | 1.84 | Tacky, guns good, fair elongation, no sag. |
| 3 | 1.28 | Tacky, guns fair, no sag, fair elongation. |
| 4 | 0.85 | Tacky, guns good, no sag, good elongation. |

EXAMPLE 9

In each of two experiments a homopolymer of tridecyl acrylate was prepared by polymerizing the monomer in an aqueous emulsion employing a recipe similar to that employed in Example 7. In experiment A the tridecyl acrylate was polymerized in the absence of tert.-dodecyl mercaptan at 60° C. for 30 hours and produced a homopolymer having a viscosity characteristic of 45 centipoises as determined for a 5 weight percent solution of the polymer in toluene at 25° C. in experiment B the tridecyl acrylate was polymerized in admixture with 5 percent by weight of tert-dodecyl mercaptan as modifying agent, at 60° C. for 30 hours and produced a homopolymer having a viscosity characteristic of 0.81 centipoise.

A portion of the polymers A and B prepared above were employed to make a calking composition by compounding the polymer with other ingredients on a pair of laboratory rolls in proportions as follows:

| Homopolymer of tridecyl acrylate | A | B |
|---|---|---|
| Viscosity | 45 | 0.81 |
| | Parts by weight | |
| Ingredient: | | |
| Polymer | 10 | 10 |
| Fibrous talc | 25 | 55 |
| Clay No. 33 | 5 | 10 |
| Asbestos shorts | 20 | 5 |
| Bodied linseed oil Z7–Z8 | 25 | 10 |
| Petroleum ether (B.P. 60°–100° C.) | 5 | 0 |
| Petroleum ether (B.P. 100–140° C) | 5 | 10 |
| | 100 | 100 |

The calking compositions had the properties:

| A | B |
|---|---|
| Stiff. | Stiff. |
| Good elongation. | Fair elongation. |
| Guns hard. | Guns hard. |
| No sag. | No sag. |
| Hand putty. | Hand putty. |

We claim:

1. A calking composition suitable for sealing joints, crack and crevices to make them water-proof, consisting of from 10 to 50 percent by weight of a polymer selected from the group consisting of homopolymers of an acrylic acid ester selected from the group consisting of butyl acrylate, amyl acrylate, hexyl acrylate, 2-ethylhexyl acrylate and tridecyl acrylate, and copolymers consisting of at least two of said acrylic acid esters, which polymer has a viscosity characteristic of from 0.8 to 45 centipoises as determined for a 5 weight percent solution of the polymer in toluene at 25° C., intimately incorporated with from 5 to 25 percent by weight of a bodied drying oil having a viscosity between Z1 and Z9 (Gardner-Holdt), from 5 to 15 percent by weight a liquid hydrocarbon solvent consisting principally of saturated aliphatic hydrocarbons boiling at 60° to 205° C. at 760 millimeters absolute pressure, and from 30 to 80 percent by weight of a filler selected from the group consisting of talc, clay and asbestos fibers and mixtures thereof per 100 parts by weight of the composition.

2. A composition as claimed in claim 1, wherein the polymer is a homopolymer of tridecyl acrylate.

3. A composition as claimed in claim 1, wherein the polymer is a homopolymer of 2-ethylhexyl acrylate.

4. A composition as claimed in claim 1, wherein the polymer is a copolymer of 2-ethylhexyl acrylate and butyl acrylate.

5. A composition as claimed in claim 1, wherein the polymer is a homopolymer of butyl acrylate.

6. A composition as claimed in claim 1, wherein the polymer is a homopolymer of amyl acrylate.

7. A composition as claimed in claim 1, wherein the polymer is a homopolymer of hexyl acrylate.

References Cited in the file of this patent

UNITED STATES PATENTS

| 2,273,780 | Dittmar | Feb. 17, 1942 |
| 2,928,796 | Heckles | Mar. 15, 1960 |
| 2,956,972 | Sterling | Oct. 18, 1960 |

OTHER REFERENCES

Von Fisher: "Paint and Varnish Technology," Reinhold Publishing Co., New York, 1948, pages 372, 378 and 379.